(12) United States Patent
Reed (10) Patent No.: US 10,117,372 B1
(45) Date of Patent: Nov. 6, 2018

(54) APPARATUS CONFIGURED TO ACT AS BOTH AN EDGER AND A SOD CUTTER

(71) Applicant: Thomas David Reed, Shelby, OH (US)

(72) Inventor: Thomas David Reed, Shelby, OH (US)

(*) Notice: Subject to any disclaimer, the term of this patent is extended or adjusted under 35 U.S.C. 154(b) by 267 days.

(21) Appl. No.: 15/131,734

(22) Filed: Apr. 18, 2016

Related U.S. Application Data (60) Provisional application No. 62/152,019, filed on Apr. 23, 2015.

(51) Int. Cl.
*A01B 49/02* (2006.01)
*A01B 45/00* (2006.01)
*A01G 3/06* (2006.01)
*A01G 20/12* (2018.01)

(52) U.S. Cl.
CPC ............ *A01B 49/02* (2013.01); *A01B 49/022* (2013.01); *A01G 3/062* (2013.01); *A01G 20/12* (2018.02)

(58) Field of Classification Search
CPC ......... A01B 1/246; A01B 51/02; A01B 49/02; A01B 49/022; A01D 34/84; A01G 3/06; A01G 3/062; A01G 20/12
USPC ........... 56/11.7; 172/13–16, 19, 40, 43, 118, 172/481; 180/19.3, 385
See application file for complete search history.

(56) References Cited

U.S. PATENT DOCUMENTS

| | | | | |
|---|---|---|---|---|
| 3,946,815 | A * | 3/1976 | Ajdukovic | A01G 20/12 172/17 |
| 4,018,287 | A * | 4/1977 | Brouwer | A01G 20/12 172/19 |
| 4,049,060 | A | 9/1977 | Hoke | |
| 4,553,606 | A * | 11/1985 | Arnold | A01G 20/12 172/19 |
| 5,690,178 | A | 11/1997 | Zehrung, Jr. et al. | |
| 5,794,708 | A * | 8/1998 | Brophy | A01G 20/12 172/19 |
| 6,874,581 | B1 | 4/2005 | Porter et al. | |
| 6,962,209 | B2 * | 11/2005 | Isaman | A01B 51/02 172/19 |
| 7,096,970 | B1 | 8/2006 | Porter et al. | |
| 7,798,242 | B2 * | 9/2010 | Bednar | A01G 20/12 172/19 |
| 8,573,320 | B2 | 11/2013 | Street et al. | |
| 2002/0084081 | A1 | 7/2002 | Nachshon | |
| 2007/0277985 | A1 | 12/2007 | Hager et al. | |
| 2015/0060094 | A1 | 3/2015 | Underhill | |

* cited by examiner

*Primary Examiner* — Robert E Pezzuto
(74) *Attorney, Agent, or Firm* — Medley, Behrens & Lewis, LLC (57) ABSTRACT

Described herein is a combination apparatus and methods of using the combination apparatus. The combination apparatus is operable as both an edger and a sod cutter. The combination apparatus includes an arm that oscillates when driven by a motor. Both a sod cutter blade and an edger blade are coupled to the arm.

20 Claims, 5 Drawing Sheets

APPARATUS CONFIGURED TO ACT AS BOTH AN EDGER AND A SOD CUTTER

RELATED APPLICATION

This application claims priority to U.S. Provisional Patent Application No. 62/152,019, filed on Apr. 23, 2015, and entitled "APPARATUS CONFIGURED TO ACT AS BOTH AN EDGER AND A SOD CUTTER", the entirety of which is incorporated herein by reference.

BACKGROUND

Landscapers conventionally utilize numerous pieces of equipment to perform respective tasks. For example, an edger is an apparatus that is configured to form edges in the earth (angularly offset from the ground plane) as the edger is moved over the earth. These edges are typically used to define flower and mulch beds. A sod cutter is an apparatus that is configured to lift sod from the ground (without damaging the sod) such that the sod can be later replaced or placed elsewhere. These two apparatuses each require maintenance and can be somewhat expensive to purchase.

SUMMARY

The following is a brief summary of subject matter that is described in greater detail herein. This summary is not intended to be limiting as to the scope of the claims.

Described herein is a combination apparatus that is configured to act as both a sod cutter and an edger. In an example, the combination apparatus can be a sod cutter that is retrofit with an attachment, where the attachment is configured to allow the sod cutter to alternatively be used as an edger. In another example, the combination apparatus can be initially designed as a sod cutter and edger combination apparatus.

In an exemplary embodiment, the combination apparatus comprises an arm that has a first side and a second side. The combination apparatus further comprises a first blade that extends approximately orthogonally from the first side of the arm, and approximately parallel to the ground plane of the earth. For example, the first blade can be attached to the arm by a suitable mechanism, such as a rivet, a threaded bolt and fastener, a weld, a clamp, etc. In another example, the arm and the first blade can be unitary.

The combination apparatus optionally includes an attachment that is (removably) attachable to the arm on the second side of the arm. The attachment can be attached to the arm in any suitable manner, including threaded bolt and fastener, clamp, bracket, etc. In another example, the attachment can be permanently coupled to the second side of the arm. A second blade is removably attachable to the attachment, and is further positionable when attached to the attachment, such that the second blade is slideable along a length of the attachment. A tightening mechanism is configured to secure the second blade in place relative to the attachment when desired by an operator of the combination apparatus.

The combination apparatus further comprises an engine that is mechanically linkable to the arm, and is therefore mechanically linkable to the first blade and the second blade. The combination apparatus also comprises a linking mechanism that is configured to mechanically link the engine to the arm and de-link the engine from the arm as desired by the operator.

In operation, when the combination apparatus is used by the operator as a sod cutter, the second blade is either removed from the attachment or positioned in the attachment at a sod cutting position (e.g., so that the second blade does not impact the ground when the combination apparatus is used as a sod cutter). The operator starts the engine and positions the combination apparatus relative to sod that is to be lifted from the earth. The operator then lowers the first blade and operates the linking mechanism to cause the engine to be mechanically linked to the arm (and optionally an axle that drives a wheel of the combination apparatus). The engine then drives the arm, causing the arm to oscillate, and thereby causing the first blade to oscillate as the combination apparatus is moved, resulting in sod being cut and lifted from the earth.

When the combination apparatus is used by the operator as an edger, the second blade is attached to the attachment, and positioned in the attachment at an edging position. That is, the second blade is positioned in the attachment and tightened therein such that the second blade is in a fixed position that is proximate the ground, with a blade edge of the second blade being positioned relative to the ground (e.g., slightly offset from orthogonal to the ground) so that when the blade impacts the ground an edge is formed. The operator ensures that the first blade is in a lifted position, starts the engine, and positions the combination apparatus relative to ground that is to be edged. The operator then utilizes the linking mechanism to cause the engine to be mechanically linked to the arm (and optionally the axle of the combination apparatus). The engine drives the arm, causing the arm to oscillate, and thereby causing the second blade to oscillate, resulting in ground being edged as the combination apparatus is moved forward. Since the first blade is lifted, no sod is cut.

It is to be understood that the attachment is optional. In other embodiments, the function of the attachment can be integrated directly into the arm, such that the attachment is unnecessary. The attachment is particularly well-suited for retrofitting a sod cutter, such that the sod cutter can be transformed into a combination apparatus.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to a combination apparatus are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the term "exemplary" is intended to mean serving as an illustration or example of something, and is not intended to indicate a preference.

Figure 1:
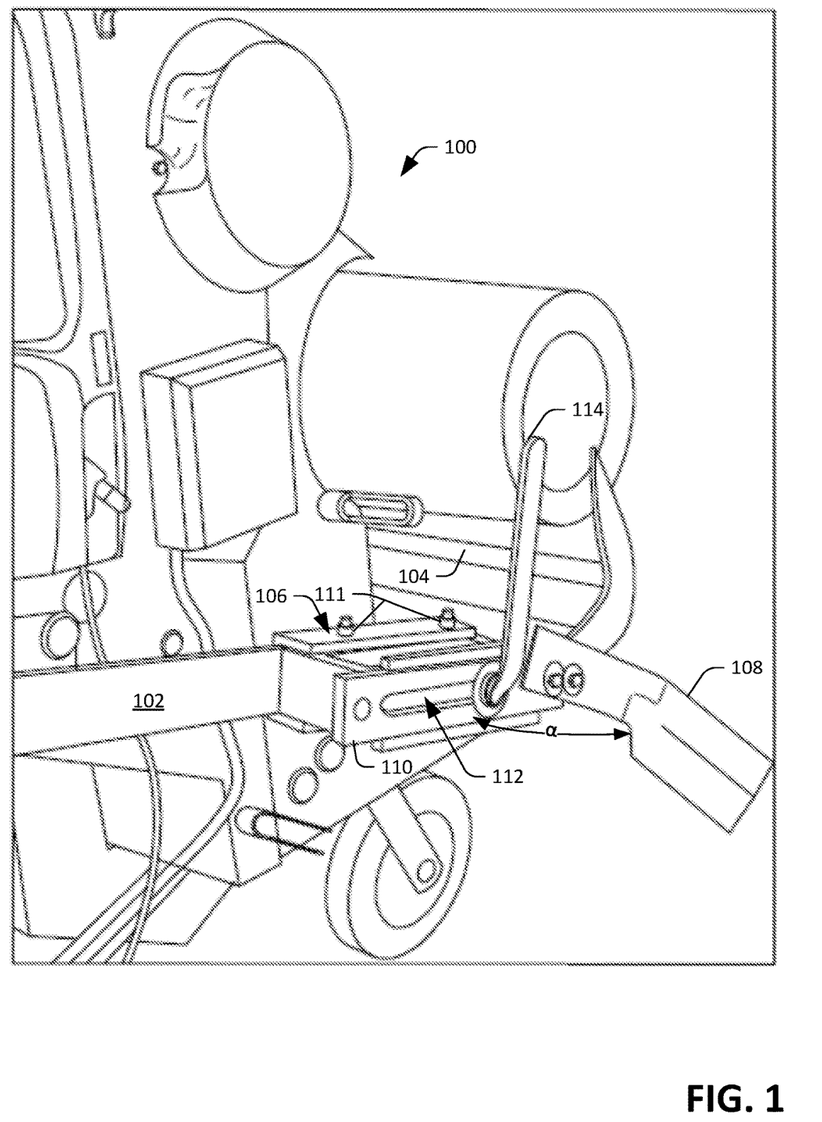
FIG. 1 is an isometric view of a portion of an exemplary combination apparatus.

With reference to FIG. 1, an isometric view of an exemplary combination apparatus 100 is illustrated, where the combination apparatus 100 can act as both a sod cutter and an edger. The combination apparatus 100 comprises an arm 102 formed of a suitable metal (such as steel) or hard plastic. The arm 102 has a first side and a second side that opposes the first side, with the second side being the exterior side of the arm 102. The combination apparatus 100 also comprises a first blade 104 that is coupled to the arm 102, extending from the first side of the arm 102, where the first blade 104 is a sod-cutting blade. The first blade 104 can be attached to the arm 102 by way of any suitable mechanism, such as threaded bolt and fastener, rivets, weld, etc. In another example, the arm 104 and the first blade 102 can be a unitary structure.

The combination apparatus 100 optionally comprises an attachment 106 that is removably attachable to the arm 102, extending from the second side of the arm 102. When attached to the arm 102, the attachment 106 remains in a fixed position relative to the arm 102. The attachment 106 can be attached to the arm 102 by way of any suitable attachment mechanism, including threaded bolt and correspondingly threaded fastener, clamps, welds, rivets, brackets, or the like. In an example, the attachment 106 can be formed of a relatively hard metal, such as steel. In another example, the attachment 106 can be formed of a hard plastic, and can be formed by way of, for example, injection molding.

The combination apparatus 100 also includes a second blade 108 that is removably attachable to the attachment 106. As shown in FIG. 1, the combination apparatus 100 can include a blade support 110 that is secured to the second blade 108, where the second blade 108 is angularly offset from the blade support 110. For example, an angle α between the second blade 108 and the blade support 110 can be between 135 degrees and 180 degrees. In FIG. 1, the second blade 108 is shown as being secured to the blade support 110 by a pair of threaded bolts and correspondingly threaded fasteners 111, although other securing mechanisms can be used. Further, the second blade 108 and the blade support 110 can be manufactured as a unitary structure.

The blade support 110 includes an elongated aperture 112 that extends laterally along a length of the blade support 110. As will be described further below, the blade support 110 can be movably slid relative to the attachment 106. With more particularity, the combination apparatus 100 also includes a lever-bolt apparatus 114. A threaded bolt of the lever-bolt apparatus 114 is positioned to extend through the elongated aperture 112 of the blade support 110, and is secured to the attachment 106 by mating the threaded bolt with a correspondingly threaded aperture in the attachment 106 (not shown) or a threaded nut. When the threaded bolt of the lever-bolt apparatus 114 is mated with the correspondingly threaded aperture of the attachment 106 (or threaded nut) such that the blade support 110 is loosely secured to the attachment 106, the blade support 110 can slide laterally in a channel of the attachment 106. The lever of the lever-bolt apparatus 114 is rotatable, where clockwise rotation of the lever of the lever-bolt apparatus 114 causes the blade support 110 to become increasingly tightly secured to the attachment 106.

While not shown, the combination apparatus 100 also includes a motor that is configured to drive the arm 102, and a linking mechanism that mechanically links the motor with the arm when the operator of the combination apparatus 100 wishes to perform a sod cutting operation or an edging operation.

An exemplary operation of the combination apparatus 100 is now set forth. First, operation of the combination apparatus 100 as a sod cutter is described. If the second blade 108 is secured to the attachment 106 (e.g., through utilization of the blade support 110), the operator can perform one of two acts: 1) the operator can position the second blade 108 relative to the attachment 106 such that the second blade 108 will not impact the ground when the combination apparatus 100 is operated as the sod cutter. This can be accomplished by rotating the lever-bolt apparatus 114 counter-clockwise, thereby loosely securing the blade support 110 to the attachment 106. Thereafter, the blade support 110 can be slid laterally (e.g., leftward in FIG. 1) in the channel of the attachment 106, as shown in FIG. 1. Subsequently, the lever-bolt apparatus 114 can be rotated clockwise, such that the blade support 110 is tightly secured to the attachment 106 in the desired position; 2) the operator can detach the second blade 108 and the blade support 110 from the attachment 106. This can be accomplished by rotating the lever-bolt apparatus 114 counter-clockwise until the threaded bolt of the lever-bolt apparatus 114 is no longer mated with the threaded aperture of the attachment 106 (or the threaded nut). The blade support 110 and the second blade 108 can then be detached from the attachment 106.

Once the second blade 108 is positioned in a sod cutting position or detached from the attachment 106, the combination apparatus 100 is usable as the sod cutter. With more particularity, the operator can ensure that the arm 102 is positioned in an "up" or "rest" position, such that the first blade 104 is positioned above the ground, as shown in FIG. 1. Thereafter, the operator can position the combination apparatus 100 at an appropriate position relative to sod that is to be displaced by the combination apparatus 100. The operator can then lower the arm 102 to an "operating" position, such that the first blade 104 is positioned close to the ground. The operator subsequently utilizes the linking mechanism to cause the engine to drive the arm 102, which in turn causes the arm 102 to oscillate (and thereby causes the first blade 104 to oscillate). Further, the linking mechanism can link the engine to an axle of the combination apparatus 100, such that as the arm 102 oscillates, the combination apparatus moves forward, such that the first blade 104 oscillates beneath the earth as the combination apparatus 100 moves forward, thereby removing the sod from the earth.

Operation of the combination apparatus 100 as an edger is now set forth. If the second blade 108 is not secured to the attachment 106, the operator initially secures the second blade 108 to the attachment 106 by way of the blade support 110 and the lever-bolt apparatus 114. Specifically, the blade support 110 is positioned in the channel of the attachment 106. The threaded bolt of the lever-bolt apparatus 114 is extended through the elongated aperture 112 of the blade support 110 and mated with the correspondingly threaded aperture of the attachment 106 at an "edger" position, such that the blade support 110 is tightly secured to the attachment 106. Alternatively, the threaded bolt of the lever-bolt apparatus 114 is extended through the elongated aperture 112 of the blade support 110 and mated with the threaded nut, such that the blade support 110 is loosely secured to the attachment 106. The blade support 110 is positioned in an "edger" position relative to the attachment 106 by sliding the blade support 110 rightward in the channel of the attachment 106. Once the blade support 110 (and the second blade 108) is placed in the "edger" position, the lever-bolt apparatus 114 is rotated clockwise, causing the threaded bolt of the lever-bolt apparatus 114 to further mate with the threaded nut, and thus tightly securing the blade support 110 to the attachment 106.

The operator then ensures that the arm 102 of the combination apparatus 100 is in an "edger" position, which can be the "up" or "rest" position, or between the "up" or "rest" position and the "operating" position. When the arm 102 is in the "edger" position, the second blade 108 is proximate to or touching the ground, while the first blade 104 is positioned above the ground. The operator subsequently positions the combination apparatus 100 at an appropriate position where ground is to be edged (e.g., where an edge of a mulch bed or flower bed is to be defined). The operator uses the linking mechanism to mechanically link the motor to the arm 102, and to optionally mechanically link the motor to the axle. This causes the arm 102 to oscillate, and thus the second blade 108 to oscillate in the ground. Hence, the operator can utilize the combination apparatus 100 as either a sod cutter or an edger, as desired by the operator.

The combination apparatus 100 exhibits numerous advantages over conventional technologies. Specifically, the operator needs to purchase a single machine (the combination apparatus 100) to perform both sod cutting and edging, rather than two separate machines. Further, many landscape jobs include sod cutting and edging tasks. When the operator is to perform such a landscaping job, the operator needs to transport only the combination apparatus 100 to perform sod cutting and edging, rather than two separate, bulky machines. Still further, the combination apparatus 100, when operated as an edger, is an improved edger over conventional edgers. This is because a motor utilized for sod cutting tends to be more powerful than conventional edger motors, allowing for edging to be performed when the ground is hard or rocky. Further, the combination apparatus 100, since it is operable as an edger, is somewhat heavier than conventional edgers, thus allowing the combination apparatus 100 to form a more even edge compared to conventional edgers. With more detail, the weight of the combination apparatus 100 may inhibit the combination apparatus 100 from bouncing when forming an edge or otherwise being moved off-course.

As noted above, while the combination apparatus 100 shown in FIG. 1 includes the attachment 106 as a retrofit mechanism that can be applied to an existing sod cutter, it is to be understood that the arm 102 can be initially designed to directly accept the second blade 108. Further, safety features can be added, such as a hood or a metal stop to prevent the second blade 108 from travelling backwards and injuring the operator.

Figure 2:
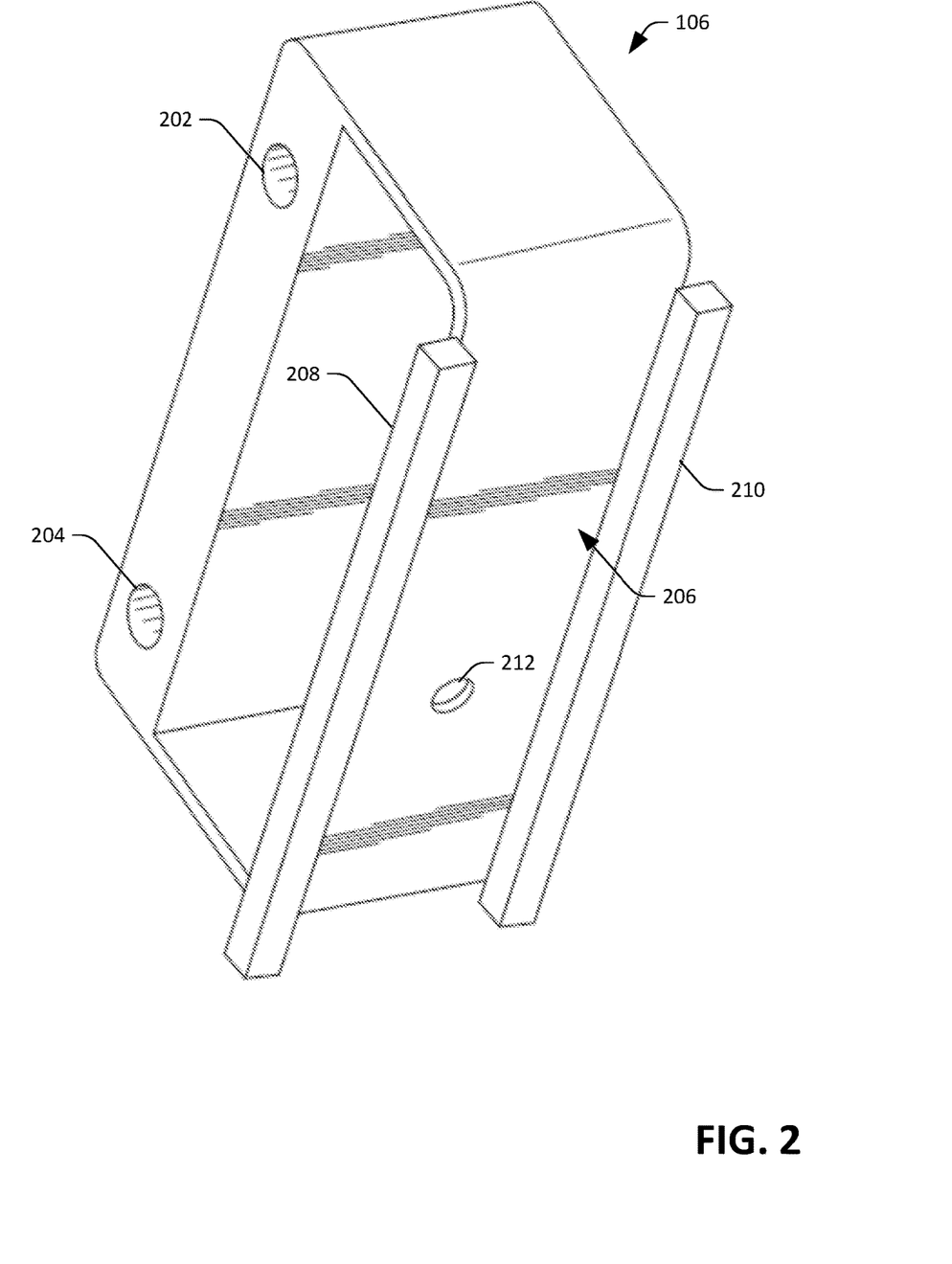
FIG. 2 is an isometric view of an exemplary attachment.

With reference now to FIG. 2, an isometric view of the exemplary attachment 106 is illustrated. The attachment 106 can be formed of a metal, such as steel, or a hard plastic. The attachment 106 includes a pair of apertures 202 and 204 that, for example, extend through an entirety of a width of the attachment 106. The attachment 106 can be secured to the arm 102 by placing the attachment 102 adjacent to an external side of the arm 102, and placing a corresponding u-shaped bracket on an interior side of the arm 102, where each side of the u-shaped bracket has a respective pair of apertures that correspond to the pair of apertures 202 and 204 of the attachment 106, as can be ascertained in FIG. 1. A pair of bolts can extend through the apertures in the sides of the u-shaped bracket, and can additionally extend through the pair of apertures 202 and 204. The bolts can have threaded ends, and corresponding threaded nuts can be employed to tightly secure the u-shaped bracket to the attachment 106, and thereby tightly secure the attachment 106 to the arm 102.

As mentioned previously, the attachment 106 can include a channel 206, where the blade support 110 is slideable in the channel 206. The channel 206 can be formed by attaching (e.g., welding or otherwise forming) a pair of posts 208 and 210 on front face of the attachment 106. In an alternative embodiment, the channel 206 can be a recessed channel, wherein the channel 206 is formed by creating a recess in the front face of the attachment 106.

The attachment 106 further includes an aperture 212 that extends through the front face of the attachment 106. The aperture 212 is configured to receive the bolt of the lever-bolt apparatus 114. In this example, the attachment 106 is hollow, such that a threaded nut can be used in connection with securing the blade support 110 to the attachment 106. Other mechanisms for securing the blade support 110 to the attachment 106 are also contemplated, including a clamp or clamps.

Figure 3:
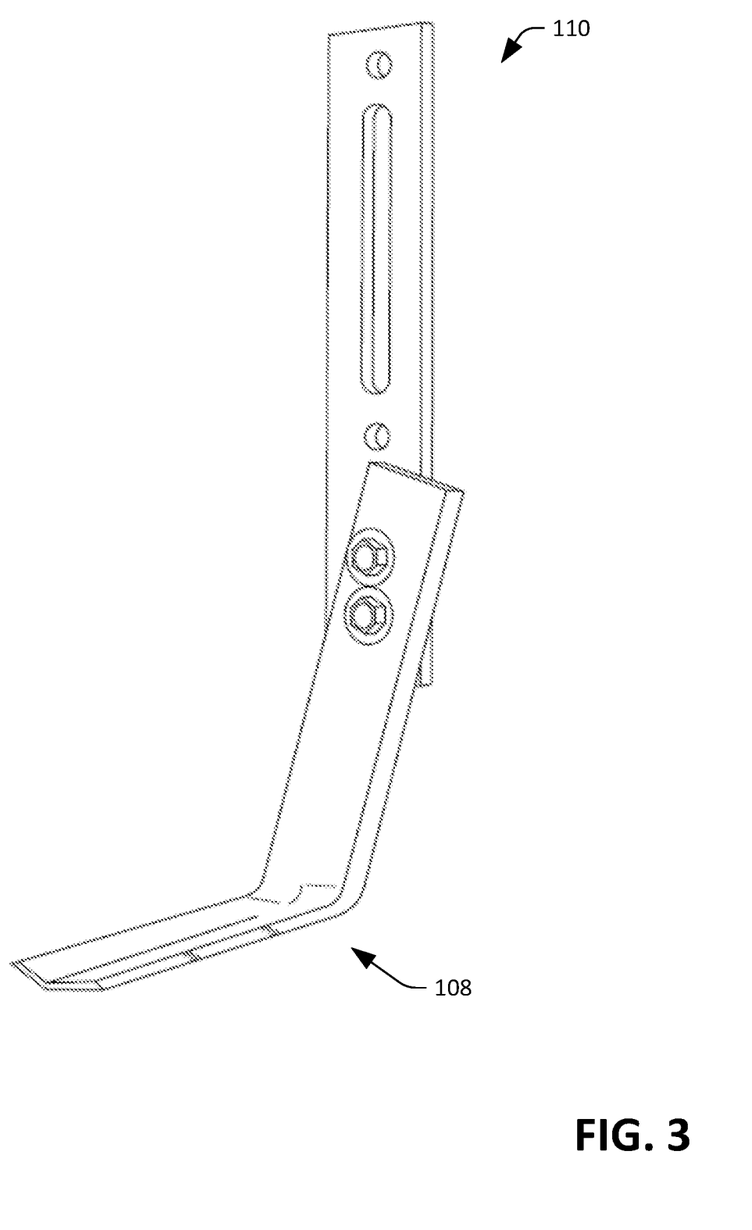
FIG. 3 is an isometric view of an exemplary blade.

Now turning to FIG. 3, an isometric view of the second blade 108 and the blade support 110 is illustrated. This illustrates that the second blade 108 includes a bend, where an angle of the bend can be between 100 degrees and 130 degrees. Further, as noted above, the second blade 108 and the blade support 110, while shown as being separate structures secured together, may be formed as a unitary structure.

Figure 4:
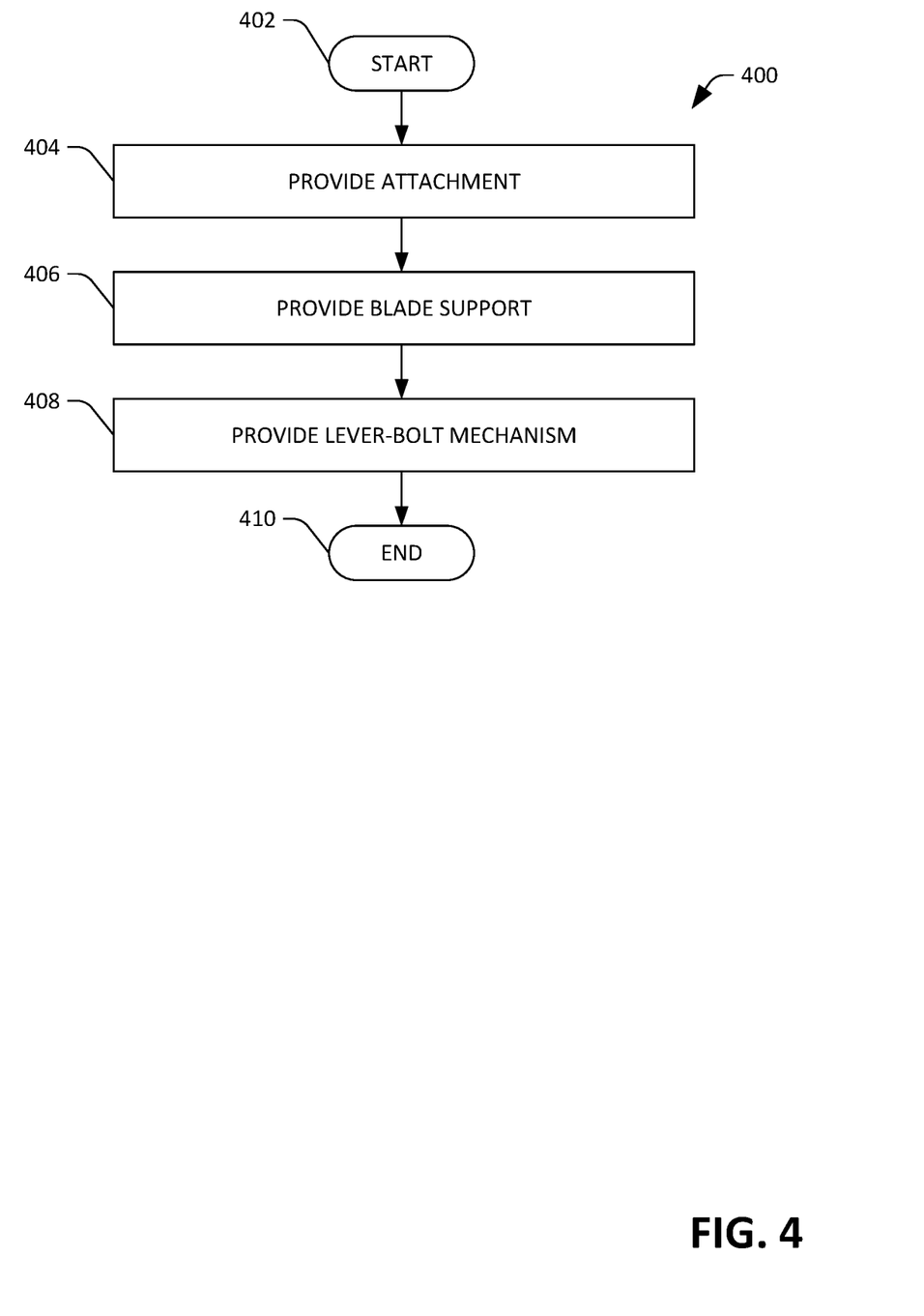
FIG. 4 is a flow diagram illustrating an exemplary methodology for forming a combination sod cutter/edger apparatus.
Figure 5:
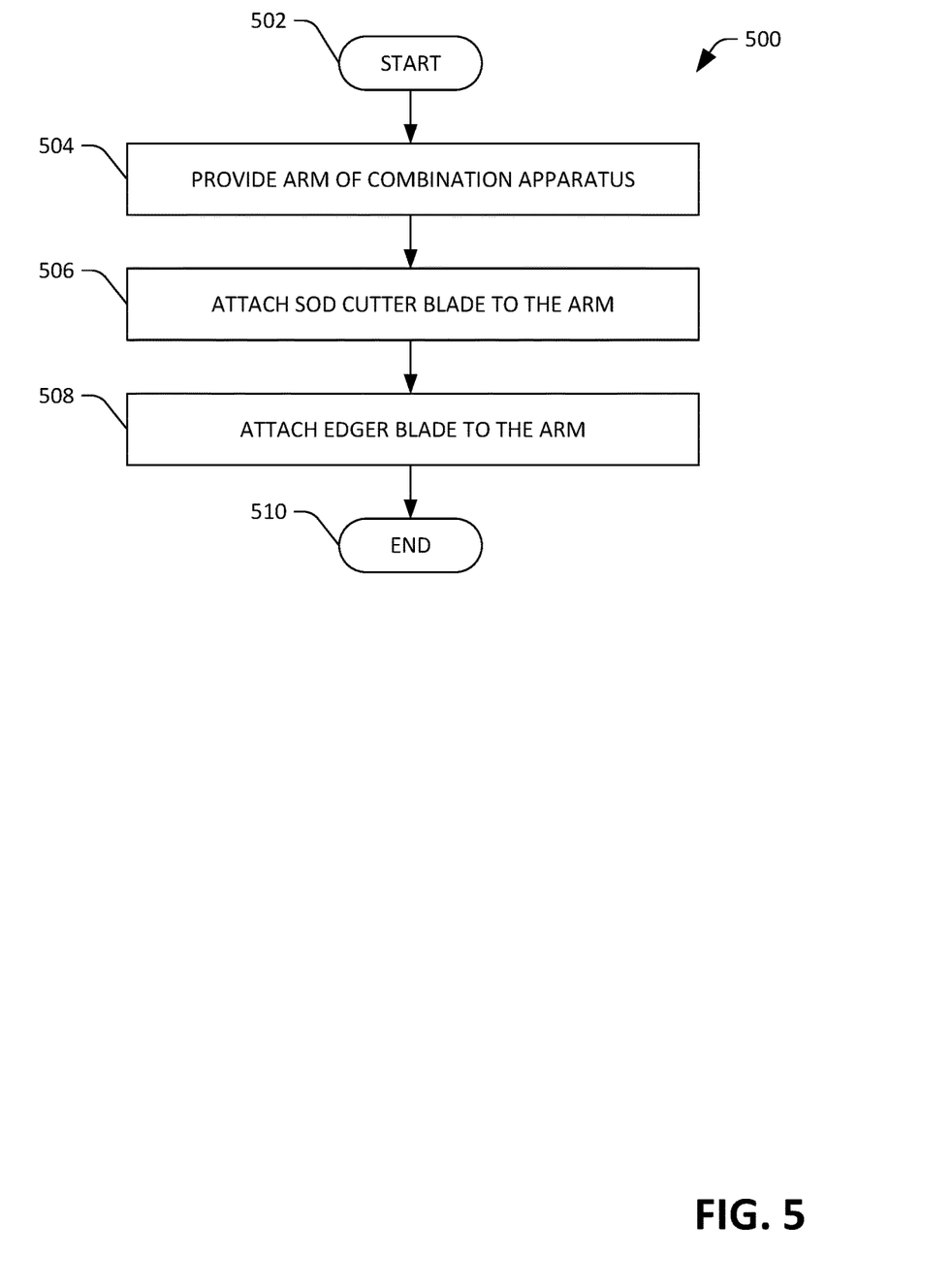
FIG. 5 is a flow diagram illustrating an exemplary methodology for forming a combination sod cutter/edger apparatus.

FIGS. 4 and 5 illustrate exemplary methodologies relating to a combination apparatus as described herein. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Referring solely to FIG. 4, an exemplary methodology 400 that facilitates retrofitting a sod cutter such that the sod cutter can operate as a combination apparatus (which can perform both sod cutting and edging operations) is described. The methodology 400 starts at 402, and at 404 an attachment is provided, where the attachment is removably attachable to an arm of a sod cutter, and where the arm is coupled to a sod cutting blade of the sod cutter. At 406, a blade support is provided, where the blade support is removably attachable to the attachment, and where further the blade support is positionable relative to the attachment. In an exemplary embodiment, an edging blade is removably attachable to the blade support. In another exemplary embodiment, the blade support and the edging blade can be formed as a unitary structure. At 408, a lever-bolt mechanism is provided, where the lever-bolt mechanism is configured to allow for the blade support to be fixed to the attachment, and is further configured to allow for the blade support to be appropriately positioned relative to the attachment. The methodology 400 completes at 410.

Now referring to FIG. 5, an exemplary methodology 500 that facilitates configuring an arm of a combination apparatus that is operable as both a sod cutter and an edger. The methodology 500 starts at 502, and at 504 the arm of the combination apparatus is provided. At 506, a sod cutter blade is attached to the arm, and at 508 an edger blade is removably attached to the arm. Further, the edger blade can moveably positioned relative to the arm, such that the edger blade can be fixed to the arm in different operating positions (e.g., where a first position corresponds to operation of the combination apparatus as a sod cutter, and a second position corresponds to operation of the combination apparatus as an edger). The methodology 500 completes at 508.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A combination apparatus that is operable as both an edger and sod cutter, the combination apparatus comprising:
    an arm mechanically linked to a motor, the arm having a first side and a second side that opposes the first side, the arm positionable in a first position and a second position;
    a sod cutter blade that is coupled to the arm and extends orthogonally from the first side of the arm;
    an attachment apparatus that is removably attachable to the arm on the second side of the arm, wherein the attachment apparatus comprises a channel that is parallel to the second side of the arm;
    a blade support that is formed to be slideable in the channel of the attachment apparatus; and
    an edger blade that is removably attachable to the blade support such that the edger blade is moveably positionable relative to the arm, wherein when the arm is positioned in the first position the combination apparatus is operable as a sod cutter, and when the arm is positioned in the second position the combination apparatus is operable as an edger.

2. The combination apparatus of claim 1, the attachment apparatus formed of steel.

3. The combination apparatus of claim 1, the attachment apparatus formed of plastic.

4. The combination apparatus of claim 1, wherein the attachment apparatus comprises two posts on a face of the attachment apparatus that are parallel to one another, the two posts form the channel.

5. The combination apparatus of claim 1, the channel being a recess in the face of the attachment apparatus.

6. The combination apparatus of claim 1, the attachment apparatus being a rectangular plate, the attachment apparatus comprises an elongated aperature along a length of the rectangular plate.

7. The combination apparatus of claim 6, further comprising a lever-bolt apparatus that is configured to secure the attachment apparatus to the attachment.

8. The combination apparatus of claim 1, further comprising a u-bracket, where an interior face of the u-bracket is adjacent to the first side of the arm, wherein the u-bracket is configured to securely fix the attachment apparatus to the arm.

9. The combination apparatus of claim 8, wherein the u-bracket comprises an aperture and the attachment apparatus comprises an aperture, wherein the aperture of the u-bracket and the aperture of the attachment apparatus are aligned when the attachment apparatus is securely fixed to the arm, and wherein a threaded bolt extends through the aperture of the u-bracket and the aperture of the attachment apparatus to mechanically fix the u-bracket to the attachment apparatus and thereby securely fix the attachment apparatus to the arm.

10. The combination apparatus of claim 1, wherein the edger blade is angularly offset from the arm.

11. A combination apparatus that is operable as both an edger and sod cutter, the combination apparatus comprising:
    an arm mechanically linked to a motor, the arm having a first side and a second side that opposes the first side, the arm positionable in a first position and a second position;
    a sod cutter blade that is coupled to the arm and extends orthogonally from the first side of the arm;
    an attachment apparatus that is removably attachable to the arm on the second side of the arm;
    a u-bracket, where an interior face of the u-bracket is adjacent to the first side of the arm, wherein the u-bracket is configured to securely fix the attachment apparatus to the arm; and
    an edger blade that is removably attachable to the attachment apparatus, wherein when the arm is positioned in the first position the combination apparatus is operable as a sod cutter, and when the arm is positioned in the second position the combination apparatus is operable as an edger.

12. The combination apparatus of claim 11, the attachment apparatus formed of steel.

13. The combination apparatus of claim 11, the attachment apparatus formed of plastic.

14. The combination apparatus of claim 11, wherein the attachment apparatus comprises a channel that is parallel to the second side of the arm, the combination apparatus further comprises a blade support, the edger blade removably attachable to the blade support, the blade support formed to be slideable in the channel of the attachment apparatus such that the edger blade is moveably positionable relative to the arm.

15. The combination apparatus of claim 14, wherein the attachment apparatus comprises two posts on a face of the attachment apparatus that are parallel to one another, the two posts form the channel.

16. The combination apparatus of claim 14, the channel being a recess in the face of the attachment apparatus.

17. The combination apparatus of claim 14, the attachment apparatus being a rectangular plate, the attachment apparatus comprises an elongated aperature along a length of the rectangular plate.

18. The combination apparatus of claim 17, further comprising a lever-bolt apparatus that is configured to secure the attachment apparatus to the attachment.

19. The combination apparatus of claim 1, wherein the u-bracket comprises an aperture and the attachment apparatus comprises an aperture, wherein the aperture of the u-bracket and the aperture of the attachment apparatus are aligned when the attachment apparatus is securely fixed to the arm, and wherein a threaded bolt extends through the aperture of the u-bracket and the aperture of the attachment apparatus to mechanically fix the u-bracket to the attachment apparatus and thereby securely fix the attachment apparatus to the arm.

20. A combination apparatus that is operable as both a sod cutter and an edger, the combination apparatus comprises:
   a motor;
   an arm mechanically linked to the motor that oscillates when driven by the motor, the arm having a first side and a second side that opposes the first side, the arm positionable in a first position and a second position;
   a sod cutter blade attached to a first side of the arm that extends orthogonally from the first side of the arm;
   an attachment apparatus that is removably attachable to the arm on the second side of the arm, wherein the attachment apparatus comprises a channel that is parallel to the second side of the arm;
   a blade support that is formed to be slideable in the channel of the attachment apparatus;
   a u-bracket, where an interior face of the u-bracket is adjacent to the first side of the arm, wherein the u-bracket is configured to securely fix the attachment apparatus to the arm;
   an edger blade that is removably attachable to the blade support such that the edger blade is moveably positionable relative to the arm, wherein when the arm is positioned in the first position the combination apparatus is operable as a sod cutter, and when the arm is positioned in the second position the combination apparatus is operable as an edger; and
   an edger blade that is removably attached to the blade support such that the edger blade is moveably positionable relative to the arm, wherein when the arm is positioned in the first position the combination apparatus is operable as a sod cutter, and when the arm is positioned in the second position the combination apparatus is operable as an edger.

* * * * *